(12) United States Patent
Misawa et al.

(10) Patent No.: US 9,456,197 B2
(45) Date of Patent: Sep. 27, 2016

(54) 3D IMAGE REPRODUCTION APPARATUS, AND PARALLAX ADJUSTMENT METHOD OF THE SAME, NON-TRANSITORY COMPUTER-READABLE STORAGE MEDIUM AND IMAGE CAPTURE DEVICE

(71) Applicant: FUJIFILM Corporation, Minato-ku, Tokyo (JP)

(72) Inventors: Takeshi Misawa, Saitama (JP); Koji Mori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 605 days.

(21) Appl. No.: 13/728,424

(22) Filed: Dec. 27, 2012

(65) Prior Publication Data

US 2013/0113895 A1 May 9, 2013

Related U.S. Application Data

(63) Continuation of application No. PCT/JP2011/059039, filed on Apr. 11, 2011.

(30) Foreign Application Priority Data

Jun. 30, 2010 (JP) .................. 2010-150209

(51) Int. Cl.
| | | |
|---|---|---|
| *H04N 7/26* | (2006.01) | |
| *H04N 13/00* | (2006.01) | |
| *H04N 13/04* | (2006.01) | |
| *G01J 1/20* | (2006.01) | |
| *G06T 15/00* | (2011.01) | |
| *H04N 13/02* | (2006.01) | |
| *G03B 35/16* | (2006.01) | |
| *G03B 35/24* | (2006.01) | |

(52) U.S. Cl.
CPC .......... *H04N 13/0203* (2013.01); *G03B 35/16* (2013.01); *G03B 35/24* (2013.01); *H04N 13/0022* (2013.01)

(58) Field of Classification Search
CPC ...... H04N 7/26; H04N 13/00; H04N 13/239; H04N 13/203; H04N 13/04
See application file for complete search history.

(56) References Cited

U.S. PATENT DOCUMENTS

2009/0142041 A1    6/2009    Nagasawa et al.

FOREIGN PATENT DOCUMENTS

| JP | 2005-73012 A | 3/2005 |
|---|---|---|
| JP | 2008-167310 A | 7/2008 |
| JP | 2009-129420 A | 6/2009 |
| JP | 2009-135686 A | 6/2009 |

OTHER PUBLICATIONS

Int'l Search Report and accompanying Written Opinion PCT/JP11/059039 Jul. 12, 2011, 10 pages in JP and English.

*Primary Examiner* — Sath V Perungavoor
*Assistant Examiner* — Patricia I Young
(74) *Attorney, Agent, or Firm* — Sughrue Mion, PLLC

(57) ABSTRACT

When there is no parallax data for a video image overall nor is there parallax data for a main imaging subject but there is image capture condition data (100 to 110), an image capture device detects a main imaging subject (114) and computes parallax from the detected position of the main imaging subject (116). The image capture device computes a relationship between the main imaging subject parallax and the main imaging subject distance (118), adjusts parallax using this relationship so as to be in a permissible range even when image capture is performed at the image capture shortest distance (120), and reproduces with the adjusted parallax (124). Reproduction can accordingly be made maintaining optimum parallax when image capture has been performed whatever the parallax during image capture.

10 Claims, 14 Drawing Sheets

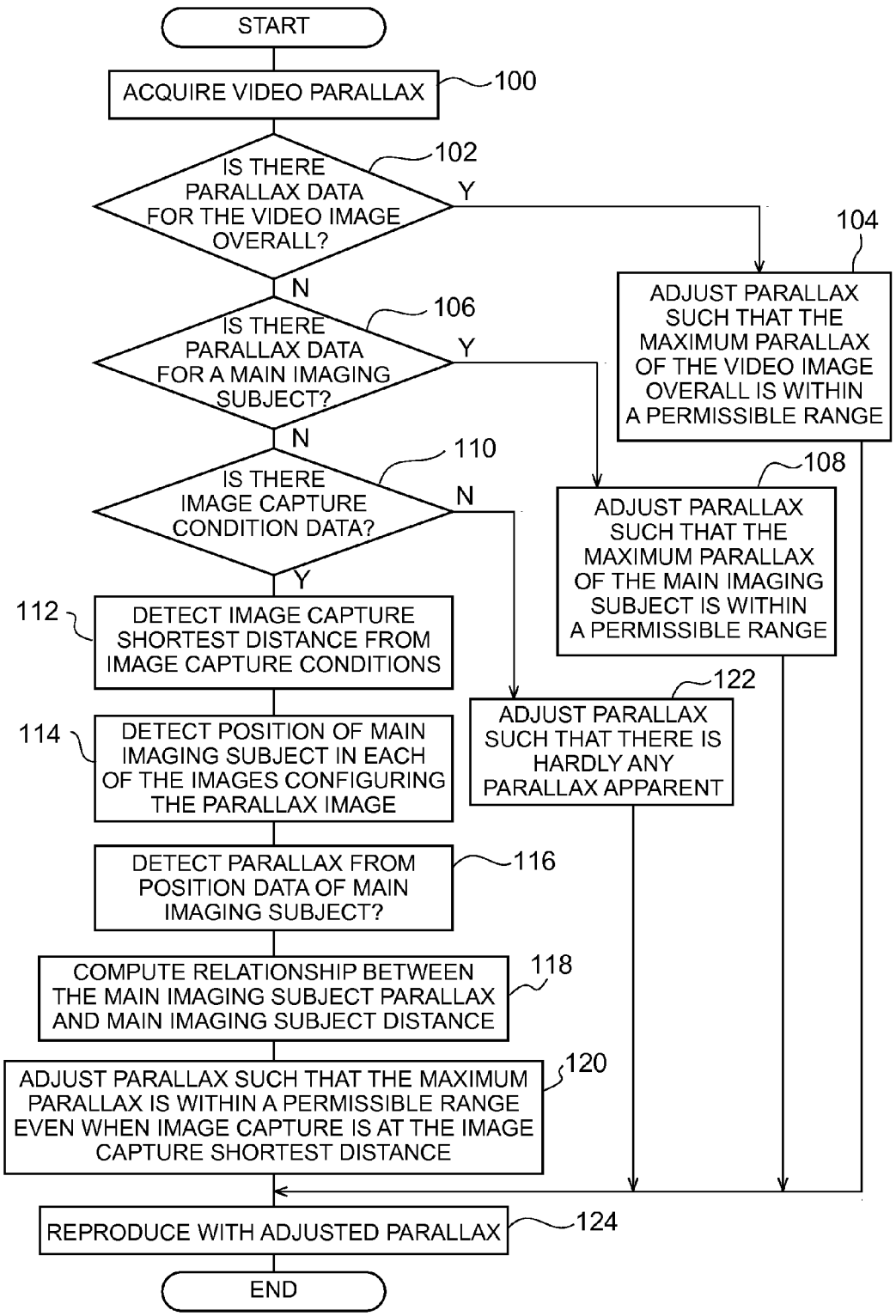

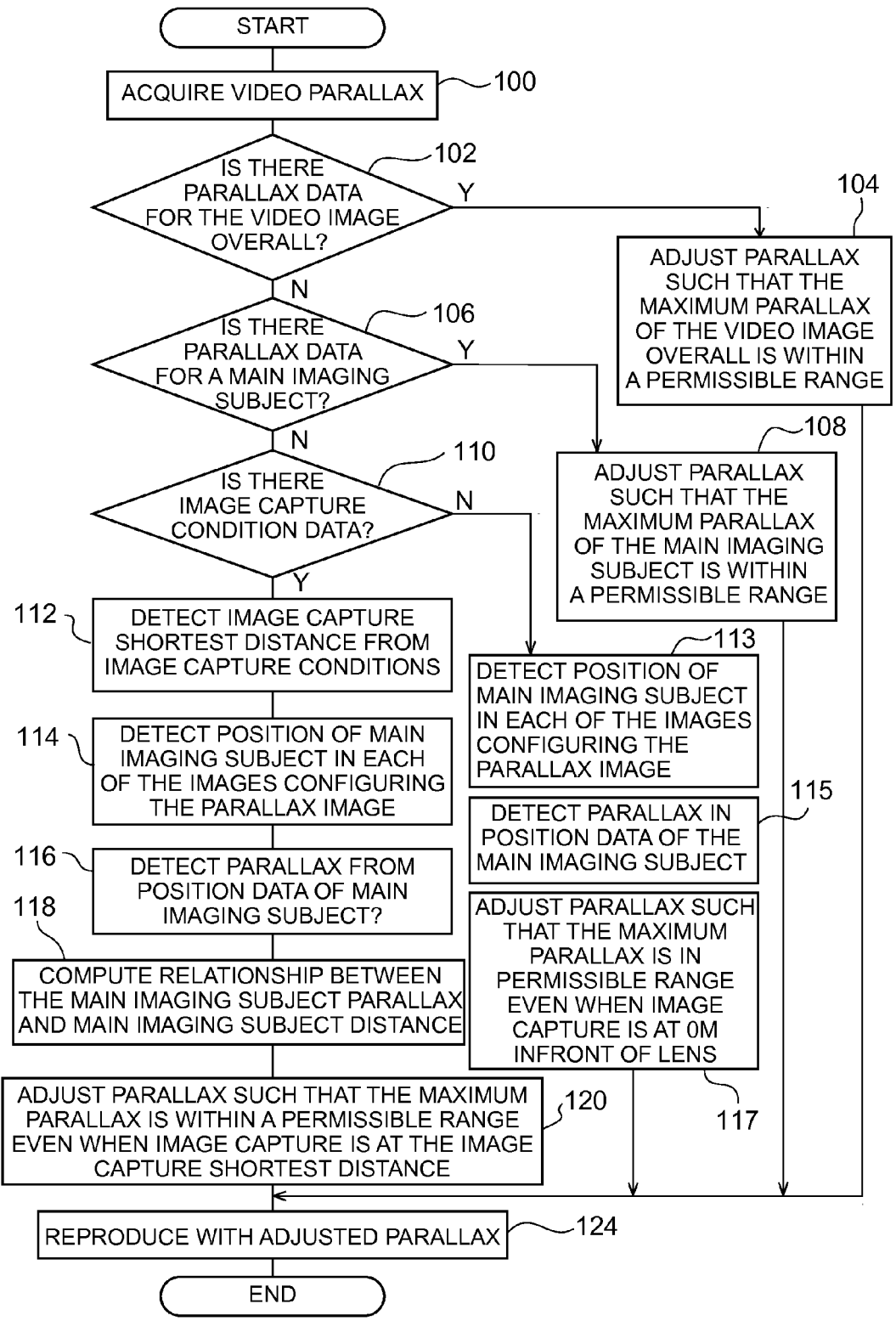

3D IMAGE REPRODUCTION APPARATUS, AND PARALLAX ADJUSTMENT METHOD OF THE SAME, NON-TRANSITORY COMPUTER-READABLE STORAGE MEDIUM AND IMAGE CAPTURE DEVICE

CROSS-REFERENCE TO RELATED APPLICATIONS

This application is a continuation application of International Application No. PCT/JP/2011/059039, filed Apr. 11, 2011, which is incorporated herein by reference. Further, this application claims priority from Japanese Patent Application No. 2010-150209, filed Jun. 30, 2010, which is incorporated herein by reference.

TECHNICAL FIELD

The present invention relates to a 3D image reproduction apparatus, and parallax adjustment method, parallax adjustment program of the same and image capture device.

BACKGROUND ART

When displaying a 3D image, it is known that the sense of 3D of a reproduced image can be changed by adjusting the displacement amount (parallax) of right eye images and left eye images, and various techniques for adjusting parallax have been proposed (see, for example, Japanese Patent Application Laid-Open (JP-A) No. 2005-73012 and JP-A No. 2009-135686).

In the technology disclosed in JP-A No. 2005-73012, parallax amount adjustment data of 3D images for display is input using a user input section and stored in a file or memory, the parallax amount adjustment data is utilized when reproducing 3D image data and 3D image data is generated and displayed.

In the technology disclosed in JP-A No. 2009-135686, a change amount in parallax angle having a value of specific value or greater in picture content containing 3D pictures, a change duration required for parallax angle change, and a number of change times that the parallax angle changes are ascertained. An evaluation value that equates to eye strain is computed based on the change amount, change duration and number of change times, and picture content is encoded and stored on a storage medium such that the evaluation value is in a specific range.

DISCLOSURE OF INVENTION

Technical Problem

However, in JP-A Nos. 2005-73012 and 2009-135686, dynamic changes in parallax in video images are not considered, and there is room for improvement to maintain appropriate parallax.

Moreover, in JP-A Nos. 2005-73012 and 2009-135686, since parallax adjustment is not considered when there is no parallax data pre-stored such as in a file, appropriate parallax adjustment cannot be performed when performing reproduction based on video image data not pre-stored with parallax data.

In consideration of the above circumstances, an object of the present invention is reproduction that maintains optimum parallax when image capture has been performed whatever the parallax during image capture.

Solution to Problem

A 3D image reproduction apparatus of the invention of claim 1 includes: an acquisition section that acquires video image data configured from a right eye image and a left eye image for displaying a 3D image, image capture shortest distance data representing an image capture shortest distance during image capture of the video image data, image capture data for computing distance, and parallax data representing a setting parallax that is set for the right eye image and the left eye image; a computation section that detects a predetermined main imaging subject in each frame of the video image data, that computes a main imaging subject parallax for each of the frames based on the detected main imaging subject, and that employs the image capture data and the setting parallax to compute a relationship between the main imaging subject parallax and a main imaging subject distance; and an adjustment section that, when the image capture shortest distance data has been acquired by the acquisition section, adjusts the setting parallax acquired by the acquisition section such that a maximum parallax of the main imaging subject is within a predetermined permissible range even when image capture was at the image capture shortest distance from the relationship between the main imaging subject parallax and the main imaging subject distance that has been computed by the computation section.

A 3D image reproduction apparatus of the invention of claim 2 is the 3D image reproduction apparatus of claim 1 wherein computation of the main imaging subject parallax and computation of the relationship between the main imaging subject parallax and the main imaging subject distance is performed by the computation section at least on a first frame containing the main imaging subject.

A 3D image reproduction apparatus of the invention of claim 3 is the 3D image reproduction apparatus of claim 1 or claim 2 wherein, when the image capture shortest distance data is not acquired by the acquisition section, the adjustment section adjusts the setting parallax such that the maximum parallax is in the permissible range even when an imaging subject approaches to immediately in front of an image capture device for capturing the video image.

A 3D image reproduction apparatus of the invention of claim 4 is the 3D image reproduction apparatus of any one of claim 1 to claim 3 wherein the adjustment section shifts horizontal direction display positions of a right eye image and a left eye image of each of the frames such that the maximum parallax is within the permissible range.

A parallax adjustment method for a 3D image reproduction apparatus of the invention of claim 5 is a method including: acquiring video image data configured from a right eye image and a left eye image for displaying a 3D image, image capture shortest distance data representing an image capture shortest distance during image capture of the video image data, image capture data for computing distance, and parallax data representing a setting parallax that is set for the right eye image and the left eye image; computing a main imaging subject parallax for each of the frames based on a main imaging subject detected by detecting a predetermined main imaging subject in each frame of the video image data, and computing a relationship between the main imaging subject parallax and a main imaging subject distance by employing the image capture data and the setting parallax; and, when the image capture shortest distance data has been acquired, adjusting the acquired setting parallax such that a maximum parallax of the main imaging subject is within a predetermined permissible range for image capture even at the acquired image capture shortest distance, using the computed relationship between the main imaging subject parallax and the main imaging subject distance.

A parallax adjustment method for a 3D image reproduction apparatus of the invention of claim 6 is the parallax adjustment method for a 3D image reproduction apparatus of claim 5 wherein computation of the relationship between the main imaging subject and the main imaging subject distance is performed at least on a first frame containing the main imaging subject.

A parallax adjustment method for an 3D image reproduction apparatus of claim 7 is the parallax adjustment method for an 3D image reproduction apparatus of claim 5 or claim 6, wherein, when the image capture shortest distance data is not acquired, the setting parallax is adjusted such that the maximum parallax is in the permissible range even when an imaging subject approaches to immediately in front of an image capture device for capturing the video image.

A parallax adjustment method for an 3D image reproduction apparatus of claim 8 is the parallax adjustment method for an 3D image reproduction apparatus of any one of claim 5 to claim 7, wherein, in parallax adjustment, horizontal direction display positions of a right eye image and a left eye image of each of the frames are shifted such that the maximum parallax is within the permissible range.

A parallax adjustment program of the invention of claim 9 causes a computer to function as each section configuring the 3D image reproduction apparatus of any one of claim 1 to claim 4.

An image capture device of the invention of claim 10 is equipped with the 3D image reproduction apparatus of any one of claim 1 to claim 4.

Advantageous Effects of Invention

The present invention exhibits the advantageous effect that the parallax is computed from a main imaging subject, and the computed parallax is adjusted so as to be in a predetermined permissible range even when image capture is at the image capture shortest distance, enabling reproduction maintaining optimum parallax when image capture has been performed whatever the parallax during image capture.

BRIEF DESCRIPTION OF DRAWINGS

FIG. 8 is a flow chart illustrating an example of a flow of processing performed by a 3D image reproduction apparatus according to the first exemplary embodiment of the present invention.

FIG. 9 is a flow chart illustrating an example of a flow of processing performed by a 3D image reproduction apparatus according to a second exemplary embodiment of the present invention.

BEST MODE FOR CARRYING OUT THE INVENTION

Explanation follows regarding an exemplary embodiment of the present invention, with reference to the drawings.

First Exemplary Embodiment

Figure 1:
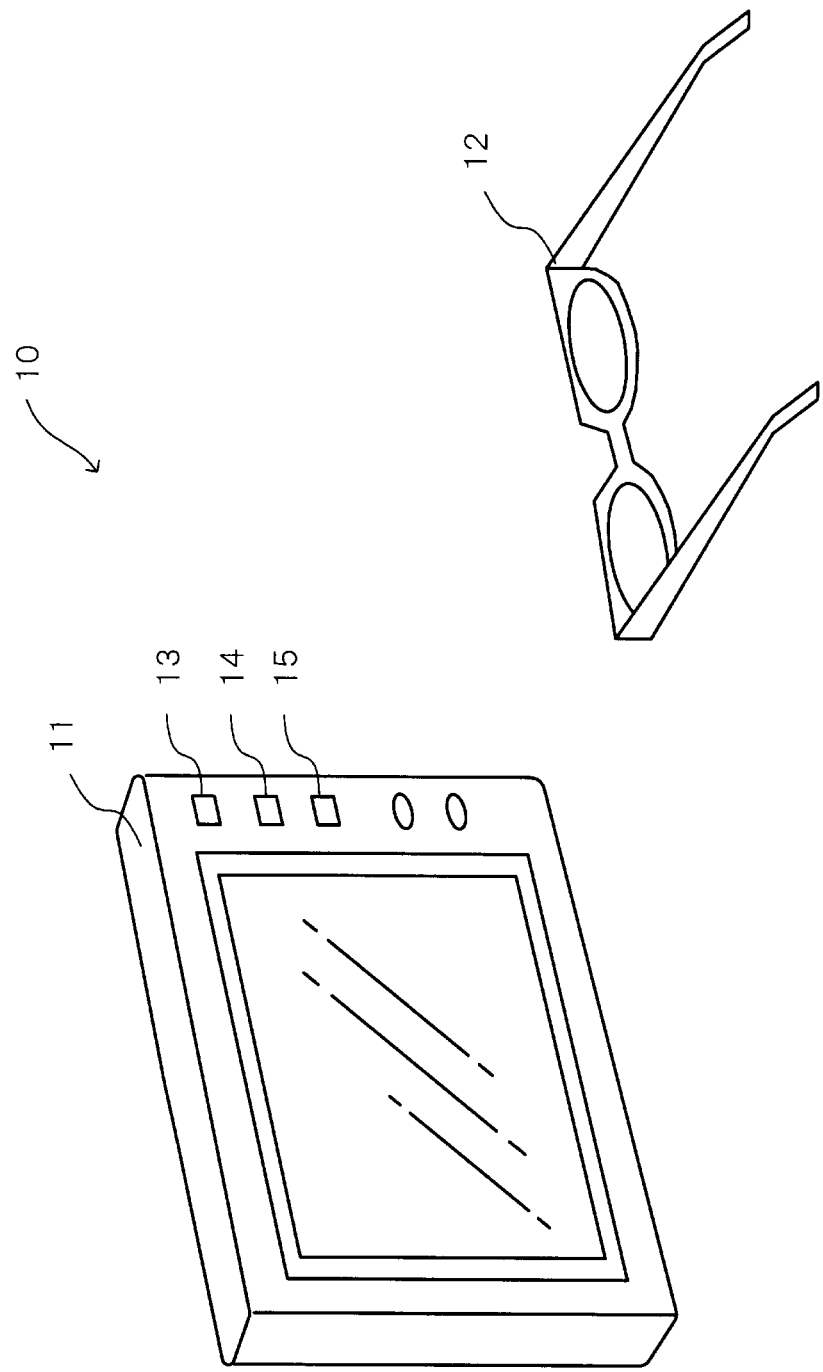
FIG. 1 is a schematic diagram illustrating a 3D image reproduction apparatus according to a first exemplary embodiment of the present invention.

FIG. 1 is a schematic diagram illustrating a 3D image reproduction apparatus 10 according to a first exemplary embodiment of the present invention.

The 3D image reproduction apparatus 10 according to the first exemplary embodiment of the present invention enables a 3D picture to be viewed by employing liquid crystal shutter glasses 12 to view a 3D picture displayed on a display device 11 for 3D image display.

In the present exemplary embodiment, explanation follows of a case of 3D image reproduction in which a liquid crystal shutter driving technique is employed to alternately display a right eye image and a left eye image on the display device 11, such that the right eye liquid crystal shutter on the liquid crystal shutter glasses 12 is in a transparent state when the right eye image is being displayed, and the left eye liquid crystal shutter on the liquid crystal shutter glasses 12 is in a transparent state when the left eye image is being displayed. Note that although in the present exemplary embodiment explanation follows regarding an example of a 3D image reproduction apparatus in which the liquid crystal shutter glasses 12 are employed to reproduce a 3D picture, there is no limitation thereto. For example, application may be made to a 3D image reproduction apparatus in which polarizing filter glasses are employed to reproduce a 3D picture, or to a 3D image reproduction apparatus that reproduces a 3D picture without using glasses. For example, application may be made to configurations in which 3D pictures are reproduced by methods employing the technologies disclosed in JP-A Nos. 2010-22067, 2010-34704 and 2010-78985.

Buttons such as a power button 13, a reproduction start button 14 and a reproduction stop button 15 are provided to the display device 11. Power is switched ON or OFF by operating the power button 13, 3D picture reproduction is started by operating the reproduction start button 14, and 3D picture reproduction is stopped by operating the reproduction stop button 15.

Figure 2:
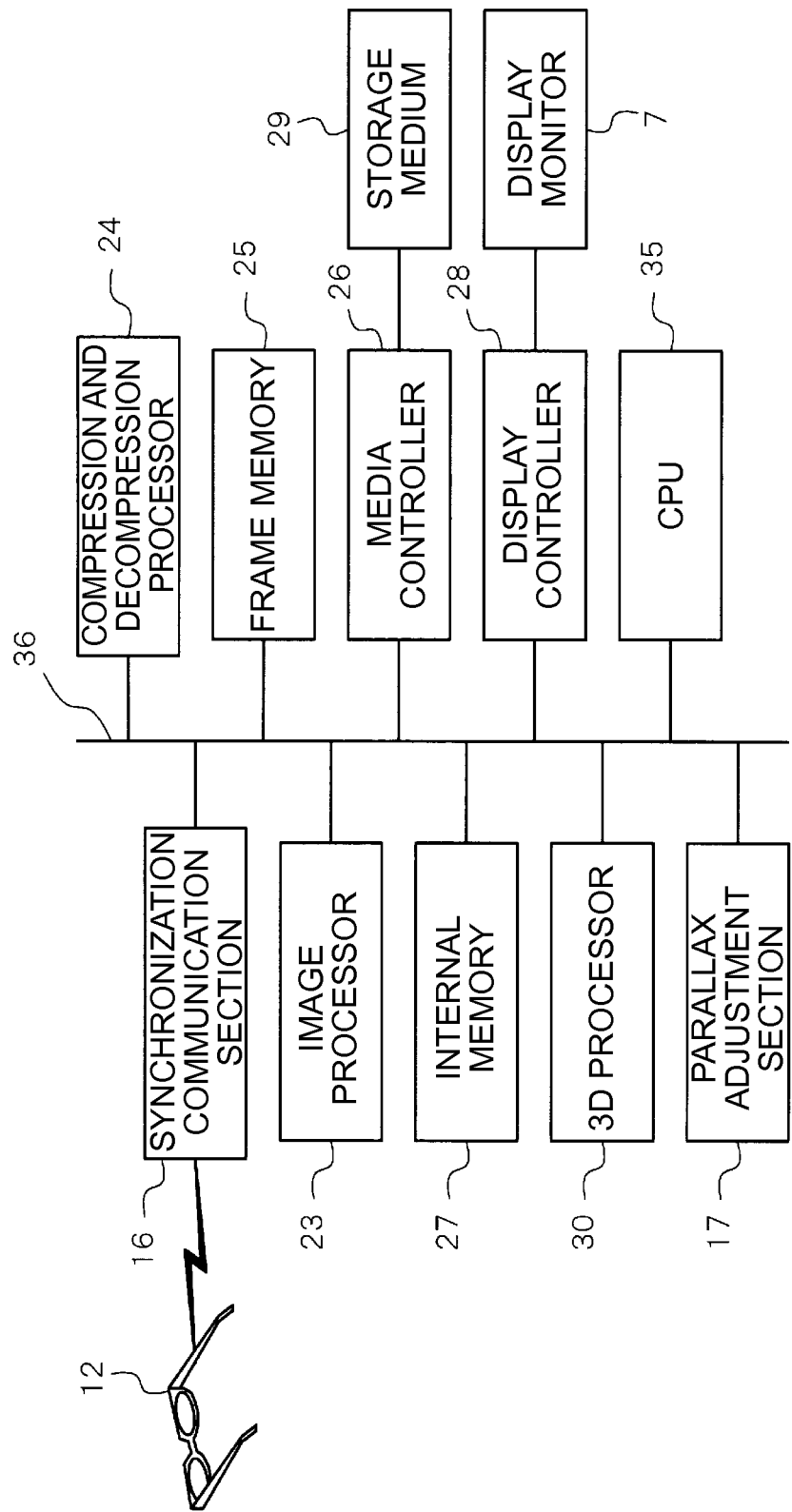
FIG. 2 is a block diagram illustrating a schematic configuration of a display device side of a 3D image reproduction apparatus according to the first exemplary embodiment of the present invention.

FIG. 2 is a block diagram illustrating a schematic configuration of the display device 11 side of the 3D image reproduction apparatus 10 according to the first exemplary embodiment of the present invention.

The display device 11 is equipped with a synchronization communication section 16, an image processing section 23, a compression and decompression processor 24, a frame memory 25, a media controller 26, an internal memory 27, a 3D processor 30, a parallax adjustment section 17, a display controller 28 and a CPU 35.

The synchronization communication section 16 communicates a signal to synchronize driving of the left and right liquid crystal shutters of the liquid crystal shutter glasses 12 to the display of respective left and right images on the display device 11.

The image processing section 23 performs various types of image processing on image data representing images to be displayed, such as white balance adjustment, shading correction, sharpness correction and color correction.

The compression and decompression processor 24 performs compression processing with a compression format such as, for example, JPEG or MPEG on image data that has been processed by the image processor 23 to generate an image file for 3D viewing, and during reproduction performs processing to decompress compressed image data.

The frame memory 25 is a working memory employed when the image processor 23 performs various types of processing on the image data.

The media controller 26 controls access to a storage medium 29 and for example writing and reading of image files.

The internal memory 27 is stored for example with data representing various settings in the display device 11 and a program executed by the CPU 35.

The 3D processor 30 reads image data stored for example on the storage medium 29, and controls the display controller 28 in synchronization with a synchronization signal obtained from communication by the synchronization communication section 16 with the liquid crystal shutter glasses 12, so as to alternately display a right eye image and a left eye image in order to display a 3D image. The 3D processor 30 performs processing to detect a main subject when parallax data is not stored for each frame in the image data, and to compute parallax for each frame.

The parallax adjustment section 17 performs parallax adjustment during reproduction utilizing such data as parallax data pre-stored associated with frame numbers in the image data and/or data for computing parallax data.

In order to perform 3D viewing, the display controller 28 alternately displays right eye images and left eye images on a display monitor 7 under control of the 3D processor 30.

Figure 3:
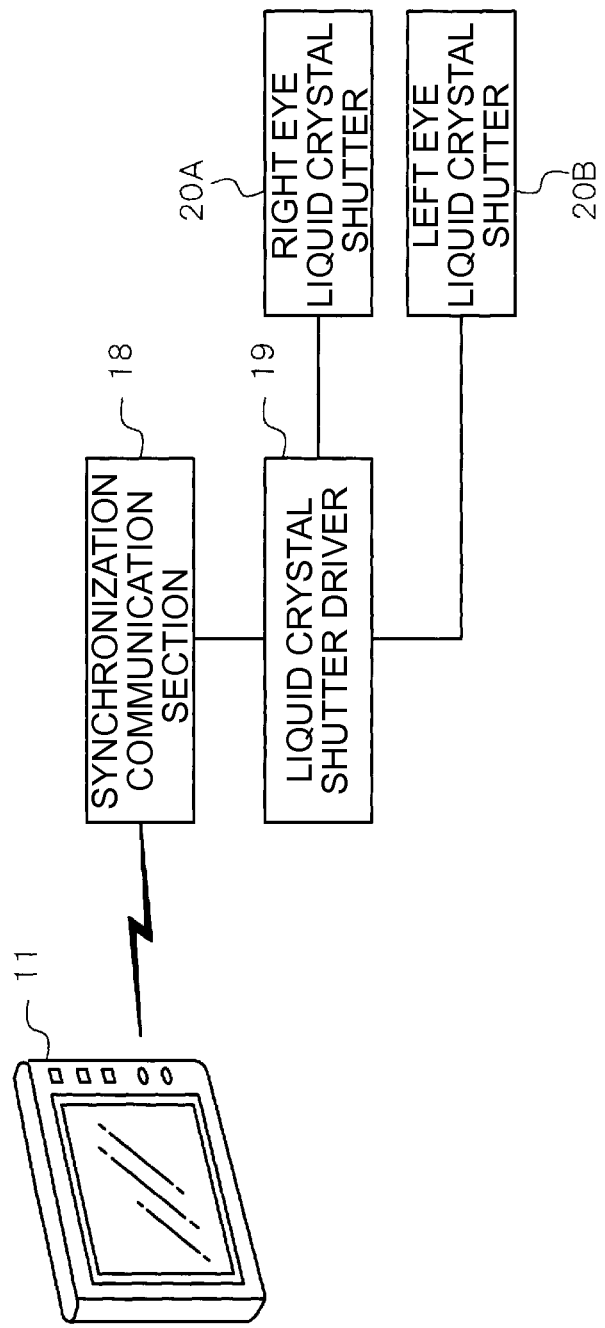
FIG. 3 is a block diagram illustrating a schematic configuration of a liquid crystal shutter glasses side of a 3D image reproduction apparatus of the first exemplary embodiment of the present invention.

FIG. 3 is block diagram illustrating a schematic configuration of the liquid crystal shutter glasses 12 side of the 3D image reproduction apparatus 10 according to the first exemplary embodiment of the present invention.

The liquid crystal shutter glasses 12 are equipped with a synchronization communication section 18, a liquid crystal shutter driver 19, a right eye liquid crystal shutter 20A and a left eye liquid crystal shutter 20B.

The synchronization communication section 18 communicates a signal for synchronizing driving of the left and right liquid crystal shutters to display of the respective left and right images on the display device 11.

The liquid crystal shutter driver 19 synchronizes with the synchronization signal obtained by communication with the display device 11 using the synchronization communication section 18, and controls driving of the right eye liquid crystal shutter 20A and the left eye liquid crystal shutter 20B. 3D images are accordingly reproduced by the right eye liquid crystal shutter 20A being in a transparent state and the left eye liquid crystal shutter 20B being in a blocking state when a right eye image is being displayed on the display monitor 7 of the display device 11, and by the left eye liquid crystal shutter 20B being in a transparent state and the right eye liquid crystal shutter 20A being in a blocking state when a left eye image is being displayed on the display monitor 7.

Figure 4:
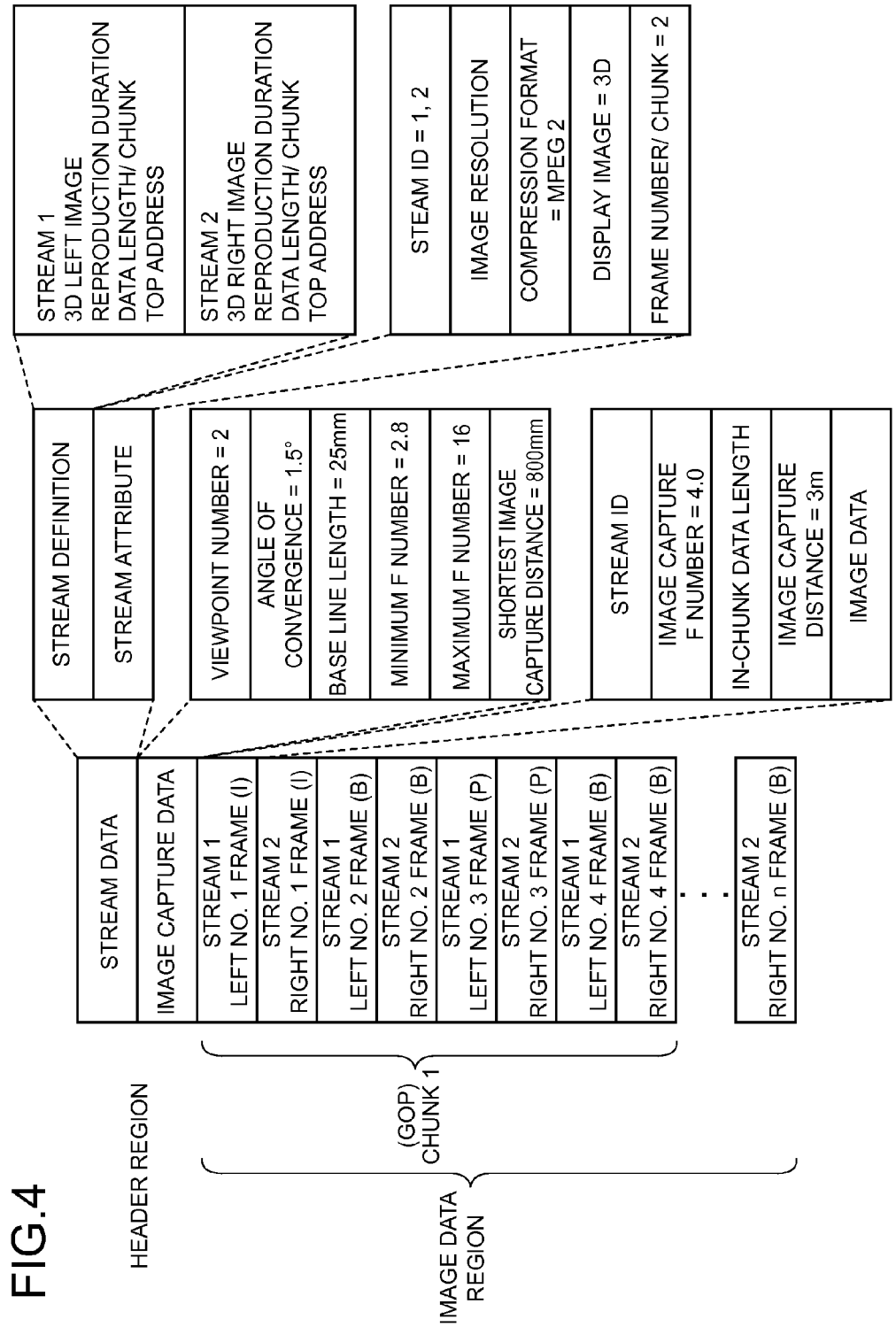
FIG. 4 is a diagram illustrating an example of an image file format for application in a 3D image reproduction apparatus according to the first exemplary embodiment of the present invention.

FIG. 4 is a diagram illustrating an example of a format of an image file for application to the 3D image reproduction apparatus 10 according to the first exemplary embodiment of the present invention.

The image file, as illustrated in FIG. 4, has a header region. The header region is configured from stream data and image capture data.

The stream data is configured with a stream definition and a stream attribute, with definitions for a stream 1 and a stream 2 stored as the stream definitions. For example, stream 1 is stored with items such as a 3D left image, a reproduction duration, a data length/chunk and a top address, and the stream 2 is stored with items such as a 3D right image, a reproduction duration, a data length/chunk and a top address.

As stream attributes, data is stored such as a stream ID=1, 2, image resolution, compression format=MPEG 2, display image=3D and frame number/chunk=2.

As image capture data, data such as viewpoint number=2, angle of convergence=1.5°, base line length=25 mm, minimum F number=2.8, maximum F number=16 and shortest image capture distance=800 mm are stored.

The image data regions are configured from chunks. As illustrated in FIG. 4, in each of the chunks respective frame images for the image streams 1, 2 are stored. The image streams 1, 2 are each stored with data such as stream ID, in-chunk data length, image capture F number=4.0, image capture distance=3 m, and image data.

When capturing a video image with a 3D camera equipped with two image capture elements, it is difficult to store parallax data for a screen as a whole since for each frame of an image, the feature points in 2 or more images need to be analyzed and parallax calculated from one of the feature points. Moreover the maximum parallax cannot be determined unless parallax has been calculated for all screens.

Figure 5:
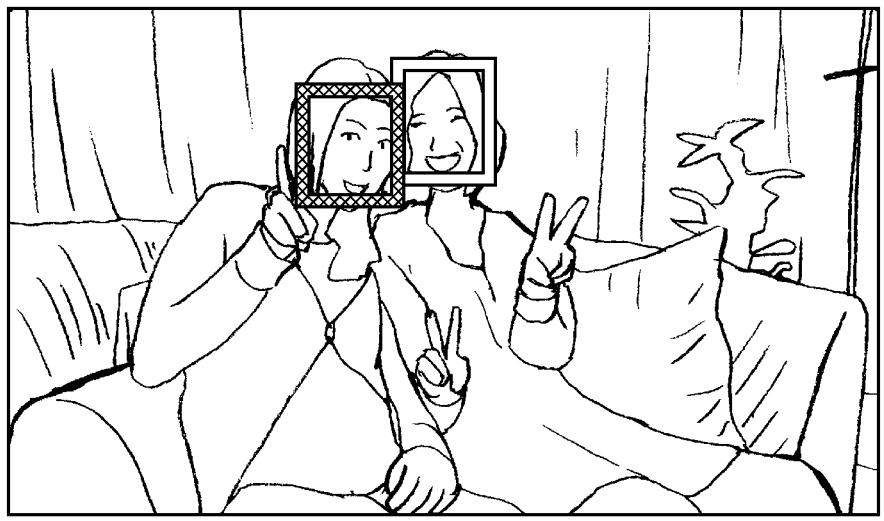
FIG. 5 is a diagram illustrating an example of face detection.
Figure 6:
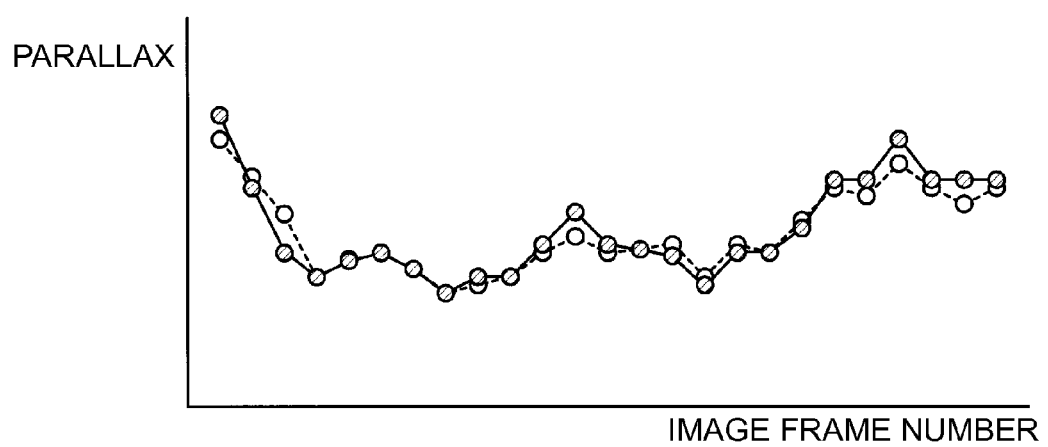
FIG. 6 is a diagram illustrating an example of a computed result of parallax for each frame of a video.

However, it is not difficult to calculate the parallax of faces when a face detection function is provided, by detecting faces as illustrated in FIG. 5. For example, results are illustrated in FIG. 6 of calculating parallax for each frame of a video from faces detected as illustrated in FIG. 5, and since two faces are detected in FIG. 6, respective parallaxes can be calculated.

There are various techniques employed as face detection methods, and the 3D image reproduction apparatus 10 is able to detect face regions using any of these methods. Therefore, the 3D image reproduction apparatus 10 is able to detect parallax of a face by detecting and comparing corresponding points in a left image and right image of the same face region. The 3D image reproduction apparatus 10, when detecting feature points of a face (for example eyes and nose) and performing face detection, is able to calculate parallax from the displacement between the feature points.

As a result, the 3D image reproduction apparatus 10 is able to detect the parallax of a face in a single scene for each frame of a video, and store parallax data for each scene at the same time as image capture. The 3D image reproduction apparatus 10 incorporates the parallax of a face (plural when there are plural present) associated with the video frame number in the header region when writing (or after first writing) image files. This data can therefore be utilized by the parallax adjustment section 17 during reproduction to perform reproduction parallax adjustment.

Moreover, there are restrictions aimed at avoiding health problems from display parallax. It is generally said that the maximum parallax on the minus side (the far side of a screen) should not exceed the pupil separation distance on the display screen (about 50 mm when considering child safety), rapid parallax change should be avoided (such as one or more times), and the parallax on the plus side (the jumping out from a screen amount) should be suppressed appropriately. The mergeable range for 3D viewing also depends on the individual and circumstances, and it is preferable to avoid excessive parallax in viewing.

It is accordingly preferable to make parallax during image capture fall within the range appropriate for display. However it is difficult to restrict parallax to within the appropriate parallax range for viewing since it is actually usually the case that the environment during reproduction and the person performing reproduction cannot be specified.

However, in the present exemplary embodiment, in the 3D image reproduction apparatus 10, parallax is restricted to within the appropriate range by the parallax adjustment section 17 performing parallax adjustment during reproduction.

As explained above, although sequential recording of the maximum parallax in image capture screens is difficult, in the 3D image reproduction apparatus 10 the parallax data of faces that are often main imaging subjects (other cases include trains and cars, or pets as specific imaging subjects for the main imaging subject) is utilized, and the parallax adjustment section 17 performs parallax adjustment during reproduction. Viewing of 3D videos can accordingly be achieved in a comparatively comfortable environment.

Detailed explanation follows regarding adjusting of parallax by the parallax adjustment section 17.

Figure 7A:
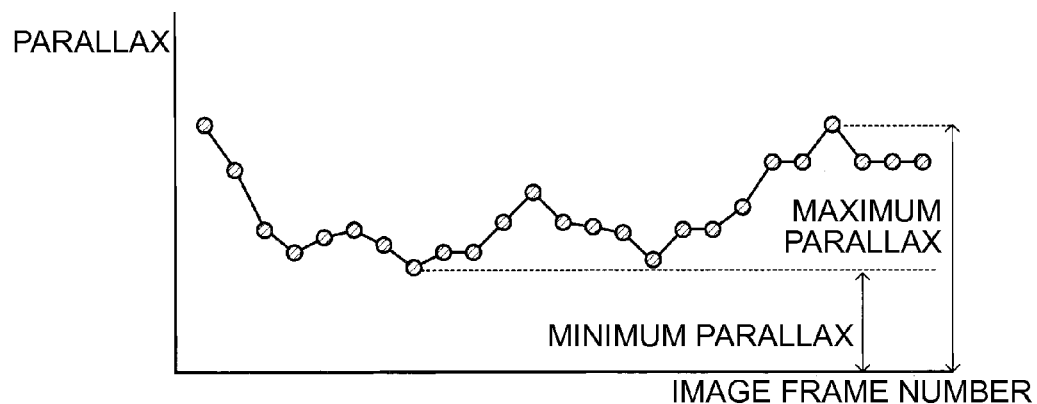
FIG. 7A is a diagram illustrating an example in which the parallax of a single main imaging subject is illustrated for each frame of a video.

FIG. 7A illustrates the parallax of a single main imaging subject in a recorded video for each frame of the video.

Figure 7B:
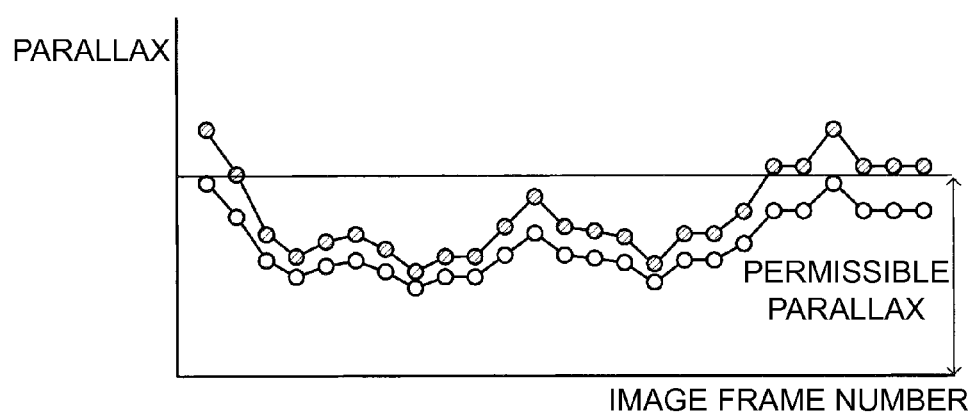
FIG. 7B is an example in which the dynamic range of parallax has been compressed.
Figure 7C:
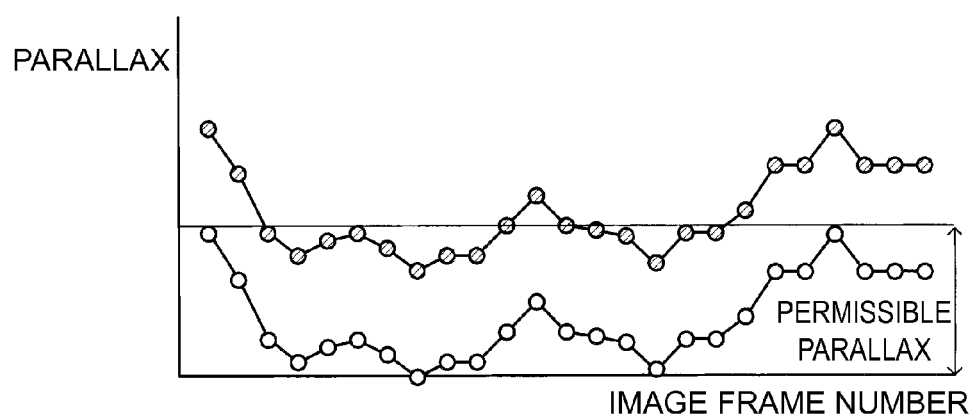
FIG. 7C is a diagram illustrating an example in which parallax has been shifted such that a maximum parallax is within a predetermined permissible range.

In the captured video image, the parallax changes large→small→large, however the parallax adjustment section 17 may be employed to make the amount jumping out at maximum parallax in the video fall within an appropriate range. As an adjustment method for parallax using the parallax adjustment section 17, application may be made of a method to compress the parallax dynamic range, as illustrated in FIG. 7B, or application may be made of a method to shift the horizontal direction display position of the right eye image and the left eye image to make the maximum parallax fall within a predetermined permissible range, as illustrated in FIG. 7C.

As long as data of parallax of a main imaging subject as illustrated in FIG. 7A is stored for example in a header of a video, the 3D image reproduction apparatus 10 is able to read out this data and perform parallax adjustment using the parallax adjustment section 17. Moreover, since the main imaging subject is ascertained during image capture, parallax data and on-screen position data can be sequentially recorded, and data of the parallax change can be obtained by acquiring the difference for each of the frames. By sequentially storing the minimum and maximum parallax, data for the maximum parallax and the minimum parallax in the video as a whole is obtained, together with screen position data when at the maximum and minimum parallax.

Even if all of the data is not stored, as long as for example the maximum parallax and the minimum parallax is stored, then it is possible to control the parallax as a whole. However, large changes in parallax with each frame is a property that causes greater strain in 3D viewing, as so preferably parallax data is stored for each frame as illustrated in FIG. 7A.

When parallax data is not stored like this for each frame in a video, in the worst case scenario an image is reproduced with parallax greater than the mergeable range of parallax, with the possibility of health problems occurring.

However, in the present exemplary embodiment, in order to prevent this possibility, when parallax data is not stored for each frame, the 3D processor 30 detects the main imaging subject(s) from the reproduction image during reproduction, and computes parallax data for each of the main imaging subjects for each frame. For example, the 3D processor 30 detects face regions of the same person in the image streams 1, 2 of the image data, acquires the coordinates of the face regions, and computes the parallax amount for each frame by deriving differences in the face coordinates between the image streams 1, 2.

An issue arising here is that the maximum parallax cannot be determined since sequential calculation is performed. Since correction such as shifting cannot be performed without determining the maximum parallax, the maximum parallax needs to be derived at least by estimation.

Generally, a camera has a particular image capture shortest distance, and focusing cannot be achieved on an imaging subject at a distance closer than the image capture shortest distance. Accordingly, reproduction with parallax exceeding the merge-capable range does not occur as long as parallax adjustment is performed during reproduction under the assumption that the imaging subject approaches only as close as the image capture shortest distance. Therefore in the present exemplary embodiment, the 3D image reproduction apparatus 10 adjusts the parallax so as to fall within a predetermined permissible range even for the image capture at the image capture shortest distance.

Moreover, the 3D image reproduction apparatus 10 needs to compute a relationship between the main imaging subject parallax and the main imaging subject distance when adjusting parallax so as to fall within the predetermined permissible range even during image capture at the image capture shortest distance. The 3D image reproduction apparatus 10 accordingly computes the above relationship from the image capture data (angle of convergence and base line length) and a pre-set setting parallax.

Figure 16:
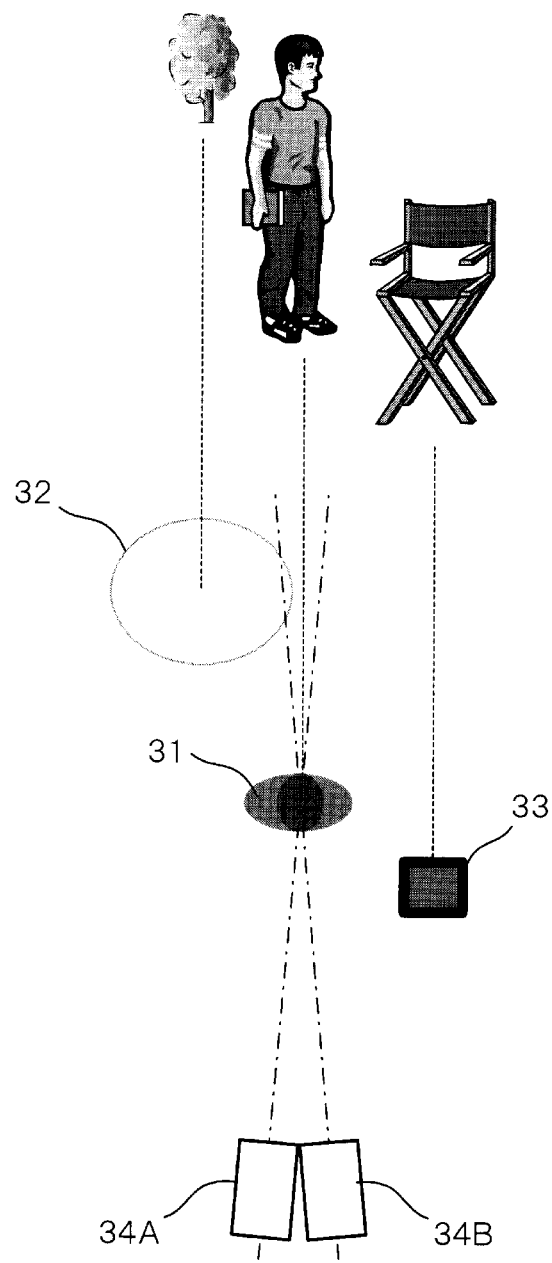
FIG. 16 is an explanatory diagram of a method for computing a relationship between a main imaging subject parallax and a main imaging subject distance.

Explanation follows regarding a method for computing the relationship between the main imaging subject parallax and the main imaging subject distance. FIG. 16 is an explanatory diagram of a computation method for the relationship between the main imaging subject parallax and the main imaging subject distance.

In a multi-lens image capture device, normally image capture is performed with the cross point (the point in space where the centers of the left and right viewpoints cross) at a fixed position from the image capture device during image capture. When image capture is performed with a parallel viewing method the cross point is at infinity. The cross point in the example of FIG. 16 is at the position of the person 31. In such cases, since there is zero parallax at the position of the person 31, if the adjustment parallax for the video image overall is also taken as unchanged, zero, then during reproduction the person 31 is positioned with respect to the screen position at this position, a tree 32 is positioned further away, and a chair 33 is positioned nearer.

In such cases, when the angle of convergence (the angle formed between lines through the centers of viewpoints for the two image capture devices in FIG. 16) is taken as 0.6°, the angle of convergence distance as a base line length (distance between viewpoints) is taken as 50 mm, then the distance to the cross point from the image capture devices is given by 25/tan 0.3°=about 4770 mm≈4.8 m. When a main imaging subject is positioned at this position, a person that is the main imaging subject is detected in the left and right images, and respective corresponding points on the person are compared, then when approximately zero this means the person is positioned at a ground point of 4.8 m and parallax is zero.

However, when the respective multi-lens of the image capture devices 34A, 34B perform image capture with an image angle range of 30°, then the image data is determined at the 4.8 m time point with respect to the image angle (for example in image capture devices with 14M as the number of pixels then the number of pixels in the horizontal direction is 4288). When calculated such that 4288 pixels is the number of pixels corresponding to 30°, then the change in image angle for every pixel is about 0.007°.

Consider now a situation in which the main imaging subject, namely the person 34, has walked forwards and is positioned in front of the position of the cross point set at image capture start. When the 3D image reproduction apparatus 10 detects the person 31 that is the main imaging subject in the left and right images and compares the respective corresponding points on the person, then suppose there is a displacement of 20 pixels to the inside (the cross point side) then the main imaging subject has moved by 10 pixels in each image, taking the average displacement in the respective images and allocating to the respective images, with this equating to a value of about 0.07° towards the inside facing each of the image capture devices. Such a case occurs when the main imaging subject has approached to 25/tan (0.3+0.07°=about 3870 mm≈3.9 m. In other words, the 3D image reproduction apparatus 10 is able to derive the relationship between the parallax (in this case the number of pixels in the horizontal direction) and the imaging subject distance. The above relationship is not always a rigorous relationship, however it is sufficient for parallax adjustment.

Explanation follows regarding a flow of processing performed in the 3D image reproduction apparatus 10 according to the first exemplary embodiment of the present invention configured as described above. FIG. 8 is a flow chart illustrating an example of a flow of processing performed in the 3D image reproduction apparatus 10 according to the first exemplary embodiment of the present invention.

First, at step 100, data relating to parallax of a video is acquired and then transition is made to step 102. Namely, image data is read from the storage medium 29 to the frame memory 25 under control of the media controller 26, and data relating to parallax is acquired by reading the header region of the image data.

At step 102, determination is made by the CPU 35 as to whether or not there is parallax data for the video overall. This determination is determination as to whether or not there is parallax data for the video overall in the data (header region) relating to parallax acquired at step 100. Processing transitions to step 104 when this determination is affirmative and processing transitions to step 106 when determination is negative.

At step 104, parallax adjustment is performed by the parallax adjustment section 17 such that the maximum parallax of the video image overall is within a permissible range, and then processing transitions to step 122. Namely, the 3D image reproduction apparatus 10 detects the maximum parallax from in the parallax data of the video overall, and adjusts the parallax by shifting the parallax or compressing the dynamic range of the parallax such that the maximum parallax falls within a predetermined permissible range.

At step 106, determination is made by the CPU 35 as to whether or not there is parallax data for a main imaging subject. In this determination, determination is made as to whether or not parallax data of a main imaging subject (for example a face of a person) is present in the data (header region) relating to parallax acquired at step 100. Processing transitions to step 108 when determination is affirmative and processing transitions to step 110 when determination is negative.

At step 108, parallax adjustment is performed by the parallax adjustment section 17 such that the maximum parallax of the main imaging subject falls within the permissible range and then processing transitions to step 122. Namely, the 3D image reproduction apparatus 10 detects the maximum parallax from in the parallax data of the main imaging subject and adjusts the parallax by shifting the parallax or compressing the dynamic range of the parallax such that the maximum parallax falls within a predetermined permissible range.

At step 110, determination is made by the CPU 35 as to whether or not there is data present relating to image capture conditions. This determination is determination as to whether or not there is data relating to image capture conditions in the data (header region) relating to parallax acquired at step 100. Processing transitions to step 112 when determination is affirmative and processing transitions to step 122 when determination is negative.

At step 112, the image capture shortest distance is detected from the image capture conditions and then processing transitions to step 114. Namely, the 3D image reproduction apparatus 10 detects the image capture shortest distance stored in the header region of the image capture data.

At step 114, a position of a main imaging subject is detected in each of the images configuring the parallax image and then processing transitions to step 116. Namely, the 3D processor 30 detects a main imaging subject (for example a face of a person) in the images to be reproduced. Note that this detection can be made by employing a known technique as a face detection method.

At step 116, the parallax is detected by the 3D processor 30 from position data of the main imaging subject and then processing transitions to step 118. The 3D image reproduction apparatus 10 calculates the parallax by deriving the difference in coordinates of the face region of the same person between the streams 1, 2 of image data.

At step 118 a relationship between the computed main imaging subject parallax and main imaging subject distance is computed and then processing transitions to step 120. Namely, the 3D image reproduction apparatus 10 computes the relationship between the main imaging subject parallax and the main imaging subject distance using a pre-set setting parallax for the video image overall and the image data (the angle of convergence and base line length that are the image capture data of the header region of the image data) as described above. Note that configuration may be made such that computation of the relationship between the main imaging subject parallax and the main imaging subject distance is performed for the first frame containing the main imaging subject, and is omitted for subsequent frames. Namely, the 3D image reproduction apparatus 10 computes the relationship between the main imaging subject parallax and the main imaging subject distance for at least the first frame containing the main imaging subject.

At step 120, the parallax is adjusted by the parallax adjustment section 17 using the image capture data and the setting parallax such that the maximum parallax falls within the permissible range even for image capture at the image capture shortest distance using the relationship between the main imaging subject parallax and the main imaging subject distance. Processing then transitions to step 124. The maximum parallax is accordingly estimated, and situations of reproduction with parallax that exceed the mergeable range are prevented.

At step 122, parallax adjustment is performed by the parallax adjustment section 17 such that parallax is hardly apparent and processing transitions to step 124. Namely, since data relating to parallax cannot be obtained, parallax is adjusted such that there is hardly any displacement between the right eye image and the left eye image.

Then at step 124, reproduction is performed with the parallax that has been adjusted by the parallax adjustment section 17, thereby completing one cycle of processing.

Thus in the present exemplary embodiment, when there is parallax data for a video image overall or when there is parallax data for a main imaging subject, the 3D image reproduction apparatus 10 employs this parallax data to adjust such that the maximum parallax is within a permissible range. However, when such parallax data is not available, a main imaging subject is detected and parallax is calculated from the position of the main imaging subject. The 3D image reproduction apparatus 10 also adjusts such that the computed parallax is within the permissible range even for image capture at the image capture shortest distance. Accordingly, whatever the image capture parallax was during image capture the 3D image reproduction apparatus 10 is able to reproduce maintaining an optimum parallax.

The 3D image reproduction apparatus 10 adjusts parallax so as to be within a predetermined permissible range, and so image reproduction with a parallax exceeding the mergeable range of parallax can be prevented.

Second Exemplary Embodiment

Explanation follows regarding a 3D image reproduction apparatus according to a second exemplary embodiment of the present invention. Note that since configuration is fundamentally the same as that of the first exemplary embodiment further explanation of the configuration is omitted.

In the present exemplary embodiment, processing differs when there is no parallax data for the video image overall, no parallax data of a main imaging subject and no data relating to image capture conditions.

Namely, in the first exemplary embodiment, parallax adjustment is performed such that there is hardly any parallax apparent when there is no parallax data for the video image overall, no parallax data of a main imaging subject and no data relating to image capture conditions. However, in the present exemplary embodiment, a parallax adjustment section 17 adjusts parallax such that a set maximum reproduction parallax is not exceeded even when approaching to 0 cm in front of the lens in a hypothetical apparatus derived from the setting parallax of a video (base line length and angle of convergence).

FIG. 9 is a flow chart illustrating an example of a flow of processing performed by a 3D image reproduction apparatus according to a second exemplary embodiment of the present invention. Note that the same reference numerals are appended to portions similar to those of the first exemplary embodiment.

First, at step 100, data relating to parallax of a video is acquired and then transition is made to step 102. Namely, image data is read from the storage medium 29 to the frame memory 25 under control of the media controller 26, and data relating to parallax is acquired by reading the header region of the image data.

At step 102, determination is made by the CPU 35 as to whether or not there is parallax data for the video overall. This determination is determination as to whether or not there is parallax data for the video overall in the data (header region) relating to parallax acquired at step 100. Processing transitions to step 104 when this determination is affirmative and processing transitions to step 106 when determination is negative.

At step 104, parallax adjustment is performed by the parallax adjustment section 17 such that the maximum parallax of the video image overall is within a permissible range, and then processing transitions to step 122. Namely, the 3D image reproduction apparatus 10 detects the maximum parallax from in the parallax data of the video overall, and adjusts the parallax by shifting the parallax or compressing the dynamic range of the parallax such that the maximum parallax falls within a predetermined permissible range.

At step 106, determination is made by the CPU 35 as to whether or not there is parallax data for a main imaging subject. In this determination, determination is made as to whether or not parallax data of a main imaging subject (for example a face of a person) is present in the data (header region) relating to parallax acquired at step 100. Processing transitions to step 108 when determination is affirmative and processing transitions to step 110 when determination is negative.

At step 108, parallax adjustment is performed by the parallax adjustment section 17 such that the maximum parallax of the main imaging subject falls within the permissible range and then processing transitions to step 122. Namely, the 3D image reproduction apparatus 10 detects the maximum parallax from in the parallax data of the main imaging subject and adjusts the parallax by shifting the parallax or compressing the dynamic range of the parallax such that the maximum parallax falls within a predetermined permissible range.

At step 110, determination is made by the CPU 35 as to whether or not there is data present relating to image capture conditions. This determination is determination as to whether or not there is data relating to image capture conditions in the data (header region) relating to parallax acquired at step 100. Processing transitions to step 112 when determination is affirmative and processing transitions to step 113 when determination is negative.

At step 112, the image capture shortest distance is detected from the image capture conditions and then processing transitions to step 114. Namely, the 3D image reproduction apparatus 10 detects the image capture shortest distance stored in the header region of the image capture data.

At step 114, a position of a main imaging subject is detected in each of the images configuring the parallax image and then processing transitions to step 116. Namely, the 3D processor 30 detects a main imaging subject (for example a face of a person) in the images to be reproduced. Note that this detection can be made by employing a known technique as a face detection method.

At step 116, the parallax is detected by the 3D processor 30 from position data of the main imaging subject and then processing transitions to step 118. For example, the parallax is calculated by deriving the difference in coordinates of the face region of the same person between the streams 1, 2 of image data.

At step 118 a relationship between the computed main imaging subject parallax and main imaging subject distance is computed and then processing transitions to step 120. Namely, the 3D image reproduction apparatus 10 computes the relationship between the main imaging subject parallax and the main imaging subject distance using a pre-set setting parallax for the video image overall and the image data (the angle of convergence and base line length that are the image capture data of the header region of the image data) as described above. Note that configuration may be made such that computation of the relationship between the main imaging subject parallax and the main imaging subject distance is performed for the first frame containing the main imaging subject, and is omitted for subsequent frames. Namely, the relationship between the main imaging subject parallax and the main imaging subject distance is computed for at least the first frame containing the main imaging subject.

At step 120, the parallax is adjusted by the parallax adjustment section 17 using the image capture data and the setting parallax such that the maximum parallax is within the permissible range even for image capture at the image capture shortest distance using the relationship between the main imaging subject parallax and the main imaging subject distance. Processing then transitions to step 122. The maximum parallax is accordingly estimated, and situations of reproduction with parallax that exceeds the mergeable range are prevented.

At step 113, the position of main imaging subject(s) are detected in each of the images configuring the parallax image, and processing then transitions to step 115. Namely, the 3D processor 30 detects main imaging subject(s) (for example face regions of people) in the images to be reproduced. Note that a known technique can be employed here as a face detection method.

At step 115, the parallax is detected by the 3D processor 30 from the position data of the main imaging subject and processing transitions to step 117. For example, the 3D image reproduction apparatus 10 calculates the parallax by deriving the difference in coordinates of face regions of the same person between the streams 1, 2 of the image data.

At step 117, the parallax is adjusted by the parallax adjustment section 17 such that the maximum parallax is within a permissible range even for image capture at 0 cm in front of the lens. Processing then transitions to step 124.

Then at step 124, reproduction is performed with the parallax that has been adjusted by the parallax adjustment section 17, thereby completing one cycle of processing.

Accordingly, the 3D image reproduction apparatus 10 in the present exemplary embodiment, in contrast to in the first exemplary embodiment, predicts the maximum parallax (parallax arising when immediately in front of a lens) even when there is no image capture condition data, and adjusts such that the maximum parallax is within a permissible range, and video image reproduction can thereby be performed without instigating a break in parallax control.

Third Exemplary Embodiment

Explanation follows regarding a 3D image reproduction apparatus according to a third exemplary embodiment of the present invention.

Explanation has been given in the first exemplary embodiment and the second exemplary embodiment of dedicated apparatuses for reproducing 3D images, however in the present exemplary embodiment the present invention is applied to a multi-lens camera.

Figure 10:
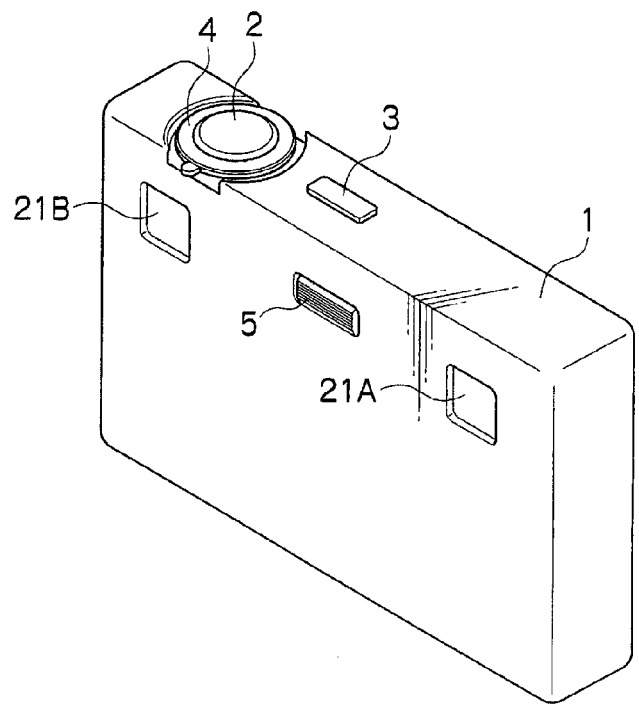
FIG. 10 is a front face side perspective view of a multi-lens camera according to a third exemplary embodiment of the present invention.
Figure 11:
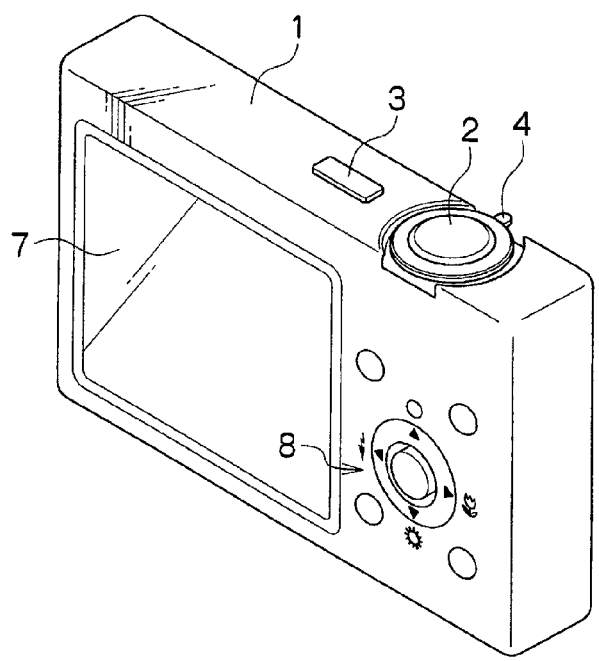
FIG. 11 is a back face side perspective view of a multi-lens camera according to the third exemplary embodiment of the present invention.

FIG. 10 illustrates a front face side perspective view of a multi-lens camera 1 according to a third exemplary embodiment of the present invention, and FIG. 11 illustrates a back face side perspective view thereof.

An upper portion of the multi-lens camera 1 is equipped with a release button 2, a power button 3 and a zoom lever 4. A flash 5 and lenses of two image capture sections 21A, 21B are disposed on the front face of the multi-lens camera 1. A liquid crystal monitor (referred to below simply as "monitor") 7 for performing various types of display and various operation buttons 8 are disposed on the back face of the multi-lens camera 1.

Figure 12:
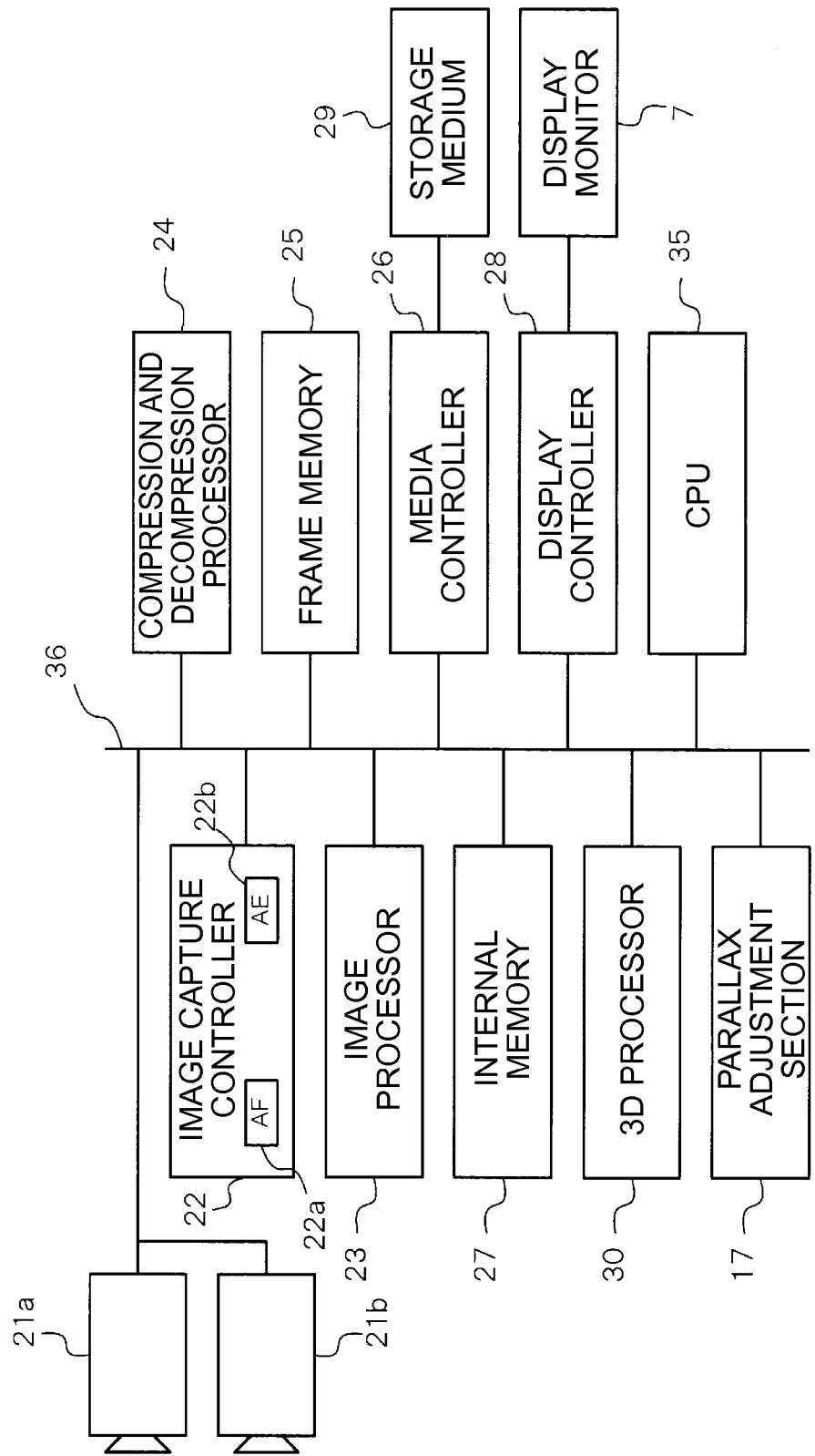
FIG. 12 is schematic block diagram illustrating an internal configuration of a multi-lens camera according to the third exemplary embodiment of the present invention.

FIG. 12 is a schematic block diagram illustrating an internal configuration of the multi-lens camera 1. Note that similar configuration to the first exemplary embodiment is allocated the same reference numerals and further explanation thereof is omitted.

The multi-lens camera 1 is equipped with the two image capture sections 21A, 21B, an image capture controller 22, an image processing section 23, a compression and decompression processor 24, a frame memory 25, a media controller 26, an internal memory 27, a display controller 28 and a CPU 35. Note that the image capture sections 21A, 21B are disposed so as to give an angle of convergence looking in at an imaging subject and a predetermined base line length. Data for the angle of convergence and base line length are stored in the internal memory 27.

The image capture sections 21A, 21B are each respectively equipped with a lens, aperture, shutter, image capture element, analogue front end (AFE) and A/D converter. The lenses include plural function-specific lenses such as lenses for implementing focusing on an imaging subject and zoom lenses for implementing a zoom function. The lens positions are adjusted by a lens drive section (not illustrated in the drawings) based on focusing data obtained by an AF processor 22a of the image capture controller 22 and zoom data obtained when the zoom lever 4 illustrated in FIG. 10 and FIG. 11 is operated. The aperture is adjusted in aperture diameter by an aperture drive section (not illustrated in the drawings) based on aperture number data obtained by an AE processor 22b of the image capture controller 22. The shutter is a mechanical shutter, and is driven by a shutter drive section (not illustrated in the drawings) at a shutter speed obtained by the AE processor 22b. The image capture element has a photoelectric surface arrayed with a large number of light pick-up elements in a two dimensional array. Light from an imaging subject is focused on the photoelectric surface, photoelectric converted, and an analogue image capture signal is acquired. A color filter with a regular array of R, G, B color filters is disposed at the front face of the image capture element. The AFE processes the analogue image capture signal output from the image capture element to remove noise from the analogue image capture signal, and performs gain adjustment processing on the analogue image capture signal (referred to below as "analogue processing"). The A/D converter converts the analogue image capture signal that has been analogue processed by the AFE into a digital signal. Note that the image expressed by the digital image data acquired by the image capture section 21A is referred to as a first image G1, and the digital image data acquired by the image capture section 21B is referred to as a second image G2.

The image capture controller 22 includes the AF processor 22a and the AE processor 22b referred to above. When the release button 2 is operated and pressed halfway, the AF processor 22a acquires ranging data from a ranging sensor, determines the focal position of the lens, and outputs to the image capture sections 21A, 21B. The AE processor 22b determines the aperture number and shutter speed based on a pre-image, and outputs these to the image capture sections 21A, 21B.

Note that the method employed by the AF processor 22a for detecting the focal position is not limited to an active method employing ranging data and a passive method may be employed to detect the focal position utilizing image contrast.

In the image capture controller 22, in order to ascertain an image capture range in a state in which the release button 2 is not being operated, the image capture sections 21A, 21B are controlled such that through images with a smaller number of pixels than main images of the first and second images G1, G2 are generated sequentially at specific time intervals (for example intervals of 1/30 second). In the image capture controller 22, when the release button 2 is operated and pressed down fully main image capture needs to be started and the image capture sections 21A, 21B are controlled to generate the main images of the first and second images G1, G2.

The above is an explanation of a still imaging mode, however it is also possible to set a video imaging mode in the present exemplary embodiment. In the video imaging mode, when the release button 2 is pressed down and video image capture starts, the first and second images G1, G2 are generated from each frame, and video image capture is stopped when the release button 2 is pressed again.

The image processing section 23 performs image processing such as white balance adjustment, shading correction, sharpness correction and color correction on digital image data of the first and second images G1, G2 acquired by the image capture sections 21A, 21B.

The compression/decompression processor 24 performs compression processing with a compression format such as, for example, JPEG or MPEG on image data expressing the first and second images G1, G2 that has been processed by the image processor 23, and generates an image file for 3D viewing. The configuration illustrated in FIG. 4 may be applied for the format of the image file.

The frame memory 25 is a working memory employed when performing various types of processing including the previously mentioned processing performed by the image processor 23 on the image data expressing the first and second images G1, G2 acquired by the image capture sections 21A, 21B.

The media controller 26 controls access to a storage medium 29 and for example writing and reading of image files.

The internal memory 27 is stored with items such as various constants set in the multi-lens camera 1 and a program executed by the CPU 35.

When viewing in 3D, the display controller 28 displays a 3D viewing image GR stored in the frame memory 25 or the storage medium 29 on the liquid crystal monitor 7.

Figure 13:
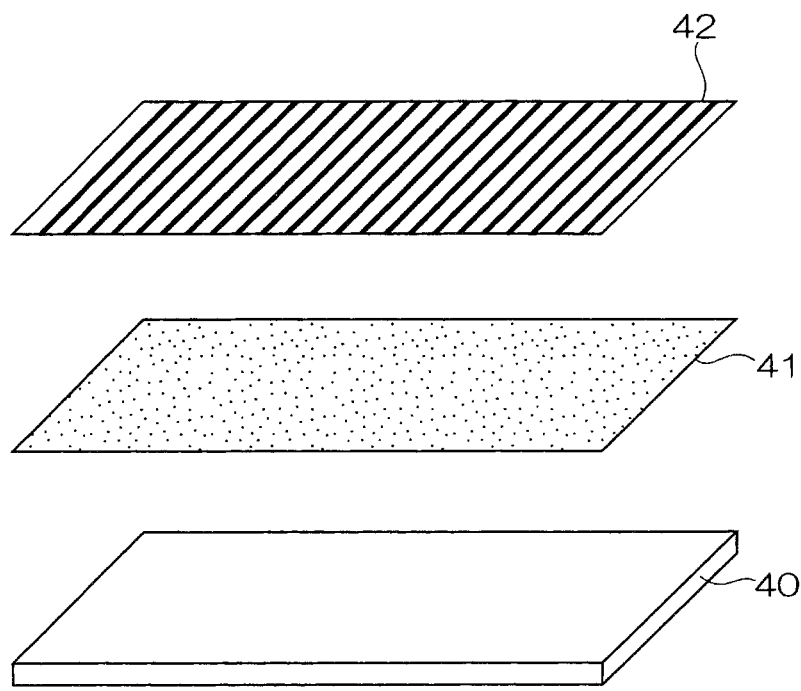
FIG. 13 is an exploded perspective view illustrating a configuration of a monitor.

FIG. 13 is an exploded perspective view illustrating a configuration of the monitor 7. As illustrated in FIG. 6, the monitor 7 is configured with stacked layers of a back light unit 40 that emits LED light and a liquid crystal panel 41 for performing various displays, with a lenticular sheet 42 attached to the front face of the liquid crystal panel 41.

Figure 14:
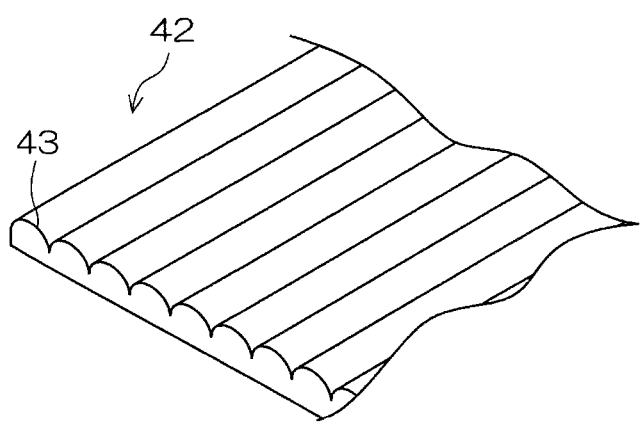
FIG. 14 is a diagram illustrating a configuration of a lenticular sheet.

FIG. 14 is a diagram illustrating a configuration of a lenticular sheet. As illustrated in FIG. 14, the lenticular sheet 42 is configured with plural cylindrical lenses 43 disposed alongside each other in a row along the direction of the base line.

The multi-lens camera 1 is equipped with a 3D processor 30. In order to perform 3D viewing display of the first and second images G1, G2 on the monitor 7, the 3D processor 30 performs 3D processing on the first and second images G1, G2 to generate the 3D viewing image GR.

Figure 15:
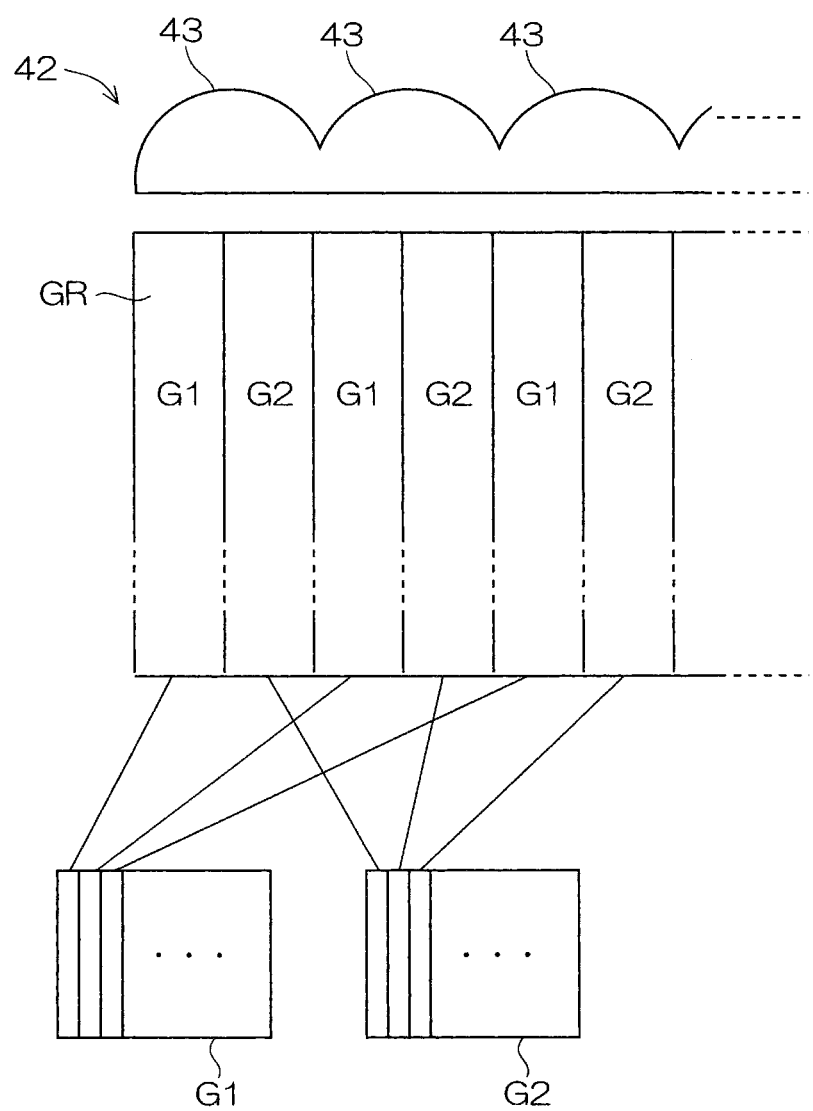
FIG. 15 is an explanatory diagram of 3D processing on first and second images G1, G2.

FIG. 15 is an explanatory diagram of 3D processing on the first and second images G1, G2. As illustrated in FIG. 15, the 3D processor 30 cuts each of the first and second images G1, G2 up into short strips along directions perpendicular to the base line. The 3D processor 30 performs 3D processing to alternately dispose the cut up short strips of the first and second images G1, G2 in positions corresponding to each of the cylindrical lenses 43 of the lenticular sheet 42, thereby generating the 3D viewing image GR. Image pairs of the first and second image G1, G2 configuring the 3D viewing image GR are disposed such that each pair corresponds to each of the cylindrical lenses 43.

The multi-lens camera 1 is equipped with a parallax adjustment section 17. The parallax adjustment section 17 adjusts the parallax in the first and second images G1, G2. Reference here to parallax means the displacement amount in pixel position of an imaging subject included in both the first and second images G1, G2 in the across direction of the first and second images G1, G2, namely in a direction along the base line. An appropriate sense of 3D can be imparted to the imaging subject included in the 3D viewing image GR by adjusting the parallax.

Configuration may be made such that the 3D processor 30 adjusts the parallax of the first and second images G1, G2 obtained by the image capture sections 21A, 21B, or configuration may be made such that the 3D processor 30 adjusts the parallax of the first and second images G1, G2 pre-stored in the storage medium 29.

Also in the multi-lens camera 1 configured as described above, a program for performing the processing as explained in the first exemplary embodiment and the second exemplary embodiment (FIG. 8 and FIG. 9) is stored for example in the internal memory 27, and by performing parallax adjustment and regeneration, similarly to in each of the above exemplary embodiments, reproduction can be performed maintaining an optimum parallax when image capture has been performed whatever the parallax during image capture, enabling prevention of reproduction of an image with parallax that exceeds a parallax mergeable range.

Note that in the third exemplary embodiment, application is made to display a 3D image employing the lenticular sheet 42 without using glasses such as liquid crystal shutter glasses 12. However, similarly to in the first exemplary embodiment, a 3D image may be reproduced using glasses such as the liquid crystal shutter glasses 12. Moreover, a configuration for displaying 3D images employing the lenticular sheet 42 may also be used back in the first exemplary embodiment and the second exemplary embodiment.

A computer readable storage medium according to the present invention is stored with a program that causes a computer to function as: an acquisition section that acquires video image data configured from a right eye image and a left eye image for displaying a 3D image, image capture shortest distance data representing the image capture shortest distance during image capture of the video image data, image capture data for computing distance, and parallax data representing a setting parallax set for the right eye image and the left eye image; a computation section that detects a predetermined main imaging subject in each frame of the video image data, that computes a main imaging subject parallax for each of the frames based on the detected main imaging subject, and that employs the image capture data and the setting parallax to compute a relationship between the main imaging subject parallax and a main imaging subject distance; and an adjustment section that, when the image capture shortest distance data has been acquired by the acquisition section, adjusts the setting parallax acquired by the acquisition section such that a maximum parallax of the main imaging subject is within a predetermined permissible range when image capture was at the image capture shortest distance from the relationship between the main imaging subject parallax and the main imaging subject distance that has been computed by the computation section.

The content disclosed in Japanese Patent Application Number 2010-150209 is incorporated by reference in its entirety in the present specification.

All cited documents, patent applications and technical standards mentioned in the present specification are incorporated by reference in the present specification to the same extent as if the individual cited documents, patent applications and technical standards were specifically and individually incorporated by reference in the present specification.

The invention claimed is:

1. A 3D image reproduction apparatus, comprising:
    an acquisition section that acquires video image data configured from a right eye image and a left eye image for displaying a 3D image, image capture shortest distance data representing an image capture shortest distance during image capture of the video image data, image capture data for computing distance, and parallax data representing a setting parallax that is set for the right eye image and the left eye image;
    a computation section that detects a predetermined main imaging subject in each frame of the video image data, that computes a main imaging subject parallax for each of the frames based on the detected main imaging subject, and that employs the image capture data and the setting parallax to compute a relationship between the main imaging subject parallax and a main imaging subject distance,
    wherein a maximum parallax of the main imaging subject is calculated using the relationship between the main imaging subject parallax and the main imaging subject distance; and
    an adjustment section that, when the image capture shortest distance data has been acquired by the acquisition section, adjusts the setting parallax acquired by the acquisition section such that the maximum parallax of the main imaging subject is within a predetermined permissible range when image capture was at the image capture shortest distance, using the relationship between the main imaging subject parallax and the main imaging subject distance that has been computed by the computation section.

2. The 3D image reproduction apparatus of claim 1, wherein the computation section performs computation of the main imaging subject parallax and computation of the relationship between the main imaging subject parallax and the main imaging subject distance at least on a first frame containing the main imaging subject.

3. The 3D image reproduction apparatus of claim 1, wherein, when the image capture shortest distance data is not acquired by the acquisition section, the adjustment section adjusts the setting parallax such that the maximum parallax is in the permissible range even when an imaging subject approaches to immediately in front of an image capture device for capturing the video image.

4. The 3D image reproduction apparatus of claim 1, wherein the adjustment section shifts horizontal direction display positions of a right eye image and a left eye image of each of the frames such that the maximum parallax is within the permissible range.

5. A parallax adjustment method for a 3D image reproduction apparatus, the method comprising:
    acquiring video image data configured from a right eye image and a left eye image for displaying a 3D image, image capture shortest distance data representing an image capture shortest distance during image capture of the video image data, image capture data for computing distance, and parallax data representing a setting parallax that is set for the right eye image and the left eye image;
    computing a main imaging subject parallax for each of the frames based on a main imaging subject detected by detecting a predetermined main imaging subject in each frame of the video image data, and computing a relationship between the main imaging subject parallax and a main imaging subject distance by employing the image capture data and the setting parallax,
    wherein a maximum parallax of the main imaging subject is calculated using the relationship between the main imaging subject parallax and the main imaging subject distance; and
    when the image capture shortest distance data has been acquired, adjusting the acquired setting parallax such that the maximum parallax of the main imaging subject is within a predetermined permissible range for image capture at the acquired image capture shortest distance, using the computed relationship between the main imaging subject parallax and the main imaging subject distance.

6. The parallax adjustment method for a 3D image reproduction apparatus of claim 5, wherein computation of the relationship between the main imaging subject and the main imaging subject distance is performed at least on a first frame containing the main imaging subject.

7. The parallax adjustment method for a 3D image reproduction apparatus of claim 5, wherein when the image capture shortest distance data is not acquired, the setting parallax is adjusted such that the maximum parallax is in the permissible range even when an imaging subject approaches to immediately in front of an image capture device for capturing the video image.

8. The parallax adjustment method for a 3D image reproduction apparatus of claim 5, wherein, in parallax adjustment, horizontal direction display positions of a right eye image and a left eye image of each of the frames are shifted such that the maximum parallax is within the permissible range.

9. A non-transitory computer-readable storage medium that stores a parallax adjustment program that causes a computer to function as:
- an acquisition section that acquires video image data configured from a right eye image and a left eye image for displaying a 3D image, image capture shortest distance data representing an image capture shortest distance during image capture of the video image data, image capture data for computing distance, and parallax data representing a setting parallax that is set for the right eye image and the left eye image;
- a computation section that detects a predetermined main imaging subject in each frame of the video image data, that computes a main imaging subject parallax for each of the frames based on the detected main imaging subject, and that employs the image capture data and the setting parallax to compute a relationship between the main imaging subject parallax and a main imaging subject distance and further determining a maximum parallax of the main imaging subject is calculated using the relationship between the main imaging subject parallax and the main imaging subject distance; and
- an adjustment section that, when the image capture shortest distance data has been acquired by the acquisition section, adjusts the setting parallax acquired by the acquisition section such that the maximum parallax of the main imaging subject is within a predetermined permissible range when image capture was at the image capture shortest distance, using the relationship between the main imaging subject parallax and the main imaging subject distance that has been computed by the computation section.

10. An image capture device equipped with the 3D image reproduction apparatus of claim 1.

* * * * *